(12) United States Patent
Krause et al.

(10) Patent No.: US 9,515,463 B2
(45) Date of Patent: Dec. 6, 2016

(54) SYSTEMS AND METHODS FOR A FUSED MOTOR LOAD GROUND

(71) Applicant: ROCKWELL AUTOMATION TECHNOLOGIES, INC., Mayfield Heights, OH (US)

(72) Inventors: Paul T. Krause, Fredonia, WI (US); Peter J. Halpin, Mequon, WI (US); Corey A. Peterson, Grafton, WI (US); Michael R. Host, Milwaukee, WI (US); Sam Newbauer, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 156 days.

(21) Appl. No.: 14/319,317

(22) Filed: Jun. 30, 2014

(65) Prior Publication Data
US 2015/0380912 A1   Dec. 31, 2015

(51) Int. Cl.
| | | |
|---|---|---|
| H02B 11/26 | (2006.01) | |
| H02B 11/12 | (2006.01) | |
| H02B 1/16 | (2006.01) | |
| H02B 1/36 | (2006.01) | |
| H02B 1/30 | (2006.01) | |
| H02B 11/28 | (2006.01) | |

(52) U.S. Cl.
CPC .............. H02B 11/26 (2013.01); H02B 1/16 (2013.01); H02B 1/36 (2013.01); H02B 11/12 (2013.01); H02B 1/30 (2013.01); H02B 11/28 (2013.01)

(58) Field of Classification Search
None
See application file for complete search history.

(56) References Cited

U.S. PATENT DOCUMENTS

| | | | | |
|---|---|---|---|---|
| 4,482,936 A | | 11/1984 | Saito | |
| 4,860,161 A | * | 8/1989 | Maki | H02B 11/133 200/50.17 |
| 5,455,760 A | * | 10/1995 | Bilas | H02H 3/00 700/22 |
| 5,481,075 A | * | 1/1996 | Kleinecke | H02B 11/12 200/50.21 |
| 7,064,947 B1 | | 6/2006 | Chisolm | |
| 8,614,618 B2 | * | 12/2013 | Darr | H01H 9/10 337/143 |

(Continued)

FOREIGN PATENT DOCUMENTS

JP   S52153133 A   12/1977

OTHER PUBLICATIONS

PCT Invitation to Pay Additional Fees for International Application No. PCT/US2015/038639, mailed Sep. 8, 2015.

Primary Examiner — Courtney Smith
(74) Attorney, Agent, or Firm — Fletcher Yoder P.C.

(57) ABSTRACT

A motor control center system is provided. The system includes an electrical enclosure having buses for routing electrical power to component units. The system also includes a component unit disposed in a compartment of the electrical enclosure. The component unit contains a component for managing a power supply to a load disposed outside of the enclosure. In addition, the system includes a ground element disposed along a support wall of the compartment, wherein the ground element provides a fused ground connection with a load terminal of the electrical enclosure when the component unit is withdrawn from the electrical enclosure.

20 Claims, 6 Drawing Sheets

(56) References Cited

U.S. PATENT DOCUMENTS

| | | | |
|---|---|---|---|
| 8,730,652 B2 * | 5/2014 | Faber | H01R 13/04 |
| | | | 174/72 B |
| 8,760,853 B1 * | 6/2014 | Bullock | H02B 11/04 |
| | | | 200/50.21 |
| 2003/0117045 A1 * | 6/2003 | Byron | H01H 31/12 |
| | | | 312/199 |
| 2006/0067018 A1 * | 3/2006 | Malkowski | H02B 11/04 |
| | | | 361/2 |
| 2008/0080117 A1 | 4/2008 | Parker | |
| 2008/0084648 A1 * | 4/2008 | King | H01H 89/06 |
| | | | 361/160 |
| 2008/0135391 A1 * | 6/2008 | McCoy | H01H 50/002 |
| | | | 200/331 |
| 2010/0236905 A1 * | 9/2010 | Capelli | H02B 11/127 |
| | | | 200/50.24 |
| 2011/0136353 A1 * | 6/2011 | Spitaels | H01R 25/003 |
| | | | 439/95 |
| 2011/0149482 A1 * | 6/2011 | Shea | H02B 13/025 |
| | | | 361/624 |

* cited by examiner though power is disconnected, the motor may still be creating voltage known as back electro-motive force (EMF). As such, it may be desirable to include a mechanism that grounds the connections of the compartments when they are removed or withdrawn, partially or fully, from the enclosure.

SYSTEMS AND METHODS FOR A FUSED MOTOR LOAD GROUND

BACKGROUND

The present invention relates generally to the field of electrical enclosures, such as enclosures for motor control centers (MCCs) used in industrial and commercial settings. More particularly, embodiments of the present invention relate to systems and methods for grounding the load connections.

A range of applications exist for packaged electrical and electronic components, particularly power electronic components such as those used to power loads in industrial applications. In one type of packaged system, typically referred to as an MCC, various switch gear, control devices, protective circuit devices, programmable logic or automation controllers, motor drives, and so forth are housed in a large enclosure that may be subdivided into compartments, bays, drawers or the like (e.g., sometimes referred to as "buckets"). The enclosure is supplied with power by power buses that extend generally in a plane toward the rear of the enclosure. The individual compartments typically house associated circuitry that may be withdrawn from the enclosure for servicing and replacement. Compartmentalizing such systems greatly enhances the ability to service the system components, and also serves to isolate the system components from one another. Thus, where access or service is required for components within one compartment of the enclosure, that compartment alone may be opened and the component support withdrawn for the necessary service.

Typical MCCs include access to power bus structures at certain locations in the rear section of the enclosure. For example, there may be multiple locations in the rear of the enclosure where compartment supports (e.g., buckets) may be slid into place and plugged into the power buses. Conventional enclosures, for example, may include a dozen rows of slots through which stab contacts extend when the compartments are placed in the enclosure. In some situations, the compartments are withdrawn or disconnected from the enclosures while various equipment (e.g., motors) are still operating. In such situations, even though power is disconnected, the motor may still be creating voltage known as back electro-motive force (EMF). As such, it may be desirable to include a mechanism that grounds the connections of the compartments when they are removed or withdrawn, partially or fully, from the enclosure.

BRIEF DESCRIPTION

Certain embodiments commensurate in scope with the originally claimed invention are summarized below. These embodiments are intended only to provide a brief summary of possible forms of the invention. Indeed, the invention may encompass a variety of forms that may be similar to or different from the embodiments set forth below.

In one embodiment, a motor control center system is provided. The system includes an electrical enclosure having buses for routing electrical power to component units. The system also includes a component unit disposed in a compartment of the electrical enclosure. The component unit contains a component for managing a power supply to a load disposed outside of the enclosure. In addition, the system includes a ground element disposed along a support wall of the compartment, wherein the ground element provides a fused ground connection with a load terminal of the electrical enclosure when the component unit is withdrawn from the electrical enclosure.

In another embodiment, a method is provided. The method includes inserting a component unit into a compartment of an electrical enclosure to engage stab housings on the component unit to buses configured to route electrical power. The method also includes supplying power to the component unit via the buses. The component unit contains a component for managing a power supply to a load disposed outside of the enclosure. In addition, the method includes removing the component unit from the electrical enclosure to disengage the stab housings on the component unit from the buses, and grounding a load terminal of the electrical enclosure by forming a fused ground connection between a ground element and the load terminal.

In another embodiment, an electrical power supply system is provided. The system includes a plurality of electrical connectors which couple a multi-phase power supply to a power component and a plurality of load terminals configured to couple the electrical power supply system to an external load. The system also includes a ground element comprising a plurality of extension pieces. The ground element forms fused ground connections between each extension piece and load terminal to ground the load terminals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
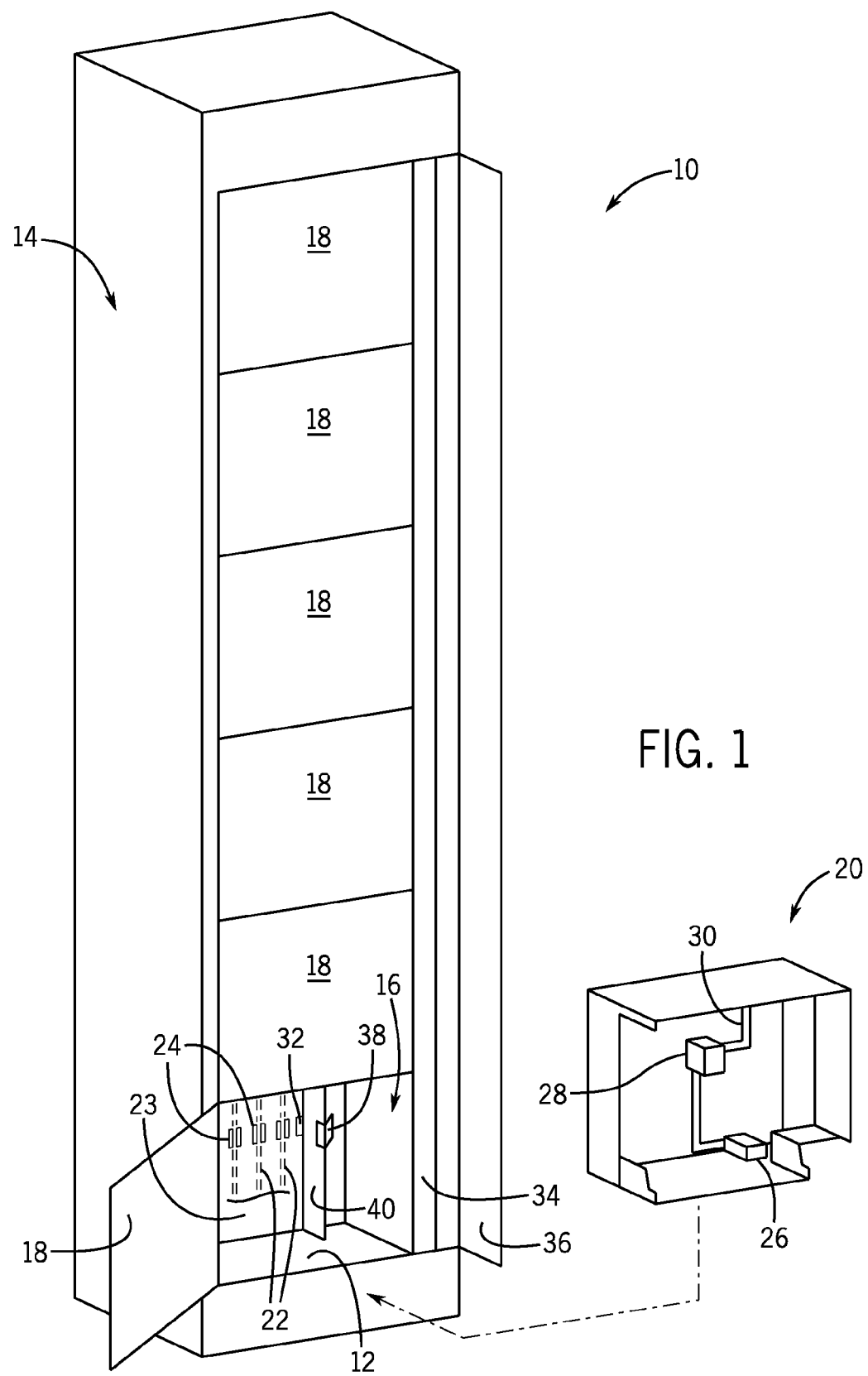
FIG. 1 is a perspective view of an embodiment of an electrical enclosure in accordance with an embodiment.

Turning now to the drawings, FIG. 1 depicts an embodiment of an electrical enclosure 10 subdivided into a plurality of compartments 12. As noted above, the enclosure 10 may house a range of electrical circuitry, such as, electrical and electronic components, switchgear, and so forth, within each compartment 12. In certain embodiments, the enclosure 10 may be configured as MCC, such as for industrial control of motors and other loads. It should be noted that, as used herein, the terms "motor control center" and "MCC" should include any suitable type of industrial, marine, commercial and other enclosure in which supports are provided for components in a compartmentalized fashion and interface with bus structures provided in the enclosure 10.

The enclosure 10 may be any suitable type and size. In a conventional MCC, for example, the enclosure 10 may define a shell 14 that encloses an internal volume 16 in which the compartments 12 are subdivided. The shell 14 may be formed of one or more panels of heavy gauge sheet metal connected together, for example, via flanges and fasteners. Each compartment 12 typically has standard dimensions, particularly various standard heights. The relative shapes, sizes, and numbers of compartments 12 within a shell 14 may vary. Depending upon the associated components to be mounted in each compartment 12, the enclosure 10 may be provided with doors 18 that permit individual compartments 12 to be opened for access to the components located therein. In particular, the enclosure 10 may include component units 20 (e.g., plug-in units 20 or buckets 20), which may be inserted into the compartments 12. Latches may be disposed on the buckets 20 and may be used to secure each bucket 20 within the compartment 12 of the enclosure 10.

In certain embodiments, the enclosure 10 includes a series of power buses 22 (shown in dashed lines in FIG. 1) that route three phases of electrical power at the rear end of the enclosure 10 to the various compartments 12. As will be appreciated by those skilled in the art, the buses 22 may be provided behind a bus cover 23 that limits access to the buses when energized. In addition, slots 24 may be provided in pairs, with a number of such rows of such slots being provided for plugging the supports of the component 20 into electrical contact with the buses. In general, conventional component supports will include stabs that extend through the slots 24 to make contact with the buses 22.

For example, each component 20 may include one or more equipment pieces 26, such as relays, motor starters, circuit breakers, variable frequency drives, programmable logic controllers (PLCs), or the like, that provide functionality for controlling a system or process. Each component 20 also may include one or more stabs housings 28 that isolate electrical connectors, such as metal power stabs that engage the vertical bus bars 22 disposed within the rear of the enclosure 10. For example, the stab housings 28 may isolate power stabs that extend through slots 24 in the bus cover 23 to engage the vertical bus bars 22 located in the rear of the enclosure 10. The bus cover 23 may longitudinally divide the interior of the electrical enclosure 10 into a front portion that houses the compartments 12 and a rear portion that extends between the bus cover 23 and the rear panel of the enclosure 10 to house power bus bars and related components. Wires 30 within the component units 20 may tie into the stab housings 28 to access the power stabs and provide power from the power stabs to the components 26.

In certain embodiments, the components 20 may include one or more connections that engage load buses 32 (e.g., motor buses, motor load bus, etc.) located in the rear of the enclosure 10. For example, the stab housings 28 may engage the load buses 32 of the enclosure 10. The enclosure 10 also includes a vertical wireway 34 over which a door 36 may be closed. As may be appreciated, electrical system components are typically disposed within the interior volume of the compartments 12, while control and communication wiring may be routed through the wireway 34. Accordingly, the enclosure 10 may manage both application of electrical power, as well as data communication, to the loads, such loads typically including various machines or motors. Further, as noted above, within the enclosure 10 may be disposed a variety of components or devices used in the operation and control of the loads. Exemplary devices contained within the enclosure 10 are motor starters, overload relays, circuit breakers, and solid-state motor control devices, such as variable frequency drives, programmable logic controllers, and so forth. The enclosure 10 may also include relay panels, panel boards, feeder-tap elements, and the like. Specifically, these devices may be disposed within component units 20 (e.g., buckets) of the enclosure 10.

In some situations, the units 20 are partially or fully withdrawn or disconnected from the enclosure 10 while various equipment (e.g., motors, loads, etc.) are still operating. For example, when the unit 20 is withdrawn or disconnected from the enclosure 10, the stab housings 28 of the unit may disengage with the vertical bus bars 22 located in the rear of the enclosure, thus disconnected the power supply to the unit 20. In such situations, even though power is disconnected, the motor may still be creating electromagnetic interferences. As such, it may be desirable to include a mechanism that grounds the connections of the units 20 when they are withdrawn from the enclosure 10.

Accordingly, in some embodiments, the enclosure 10 may include a ground element 38, such as a ground bracket, configured to ground the motor bus 32 when the unit 20 is withdrawn from the enclosure 10. The ground element 38 may be disposed on a support wall 40 within the enclosure 10, such that the ground element 28 and the support wall 40 engage with the unit 20 as the unit 20 is inserted or withdrawn from the enclosure 10, as further described with respect to FIGS. 2-3.

Figure 2:
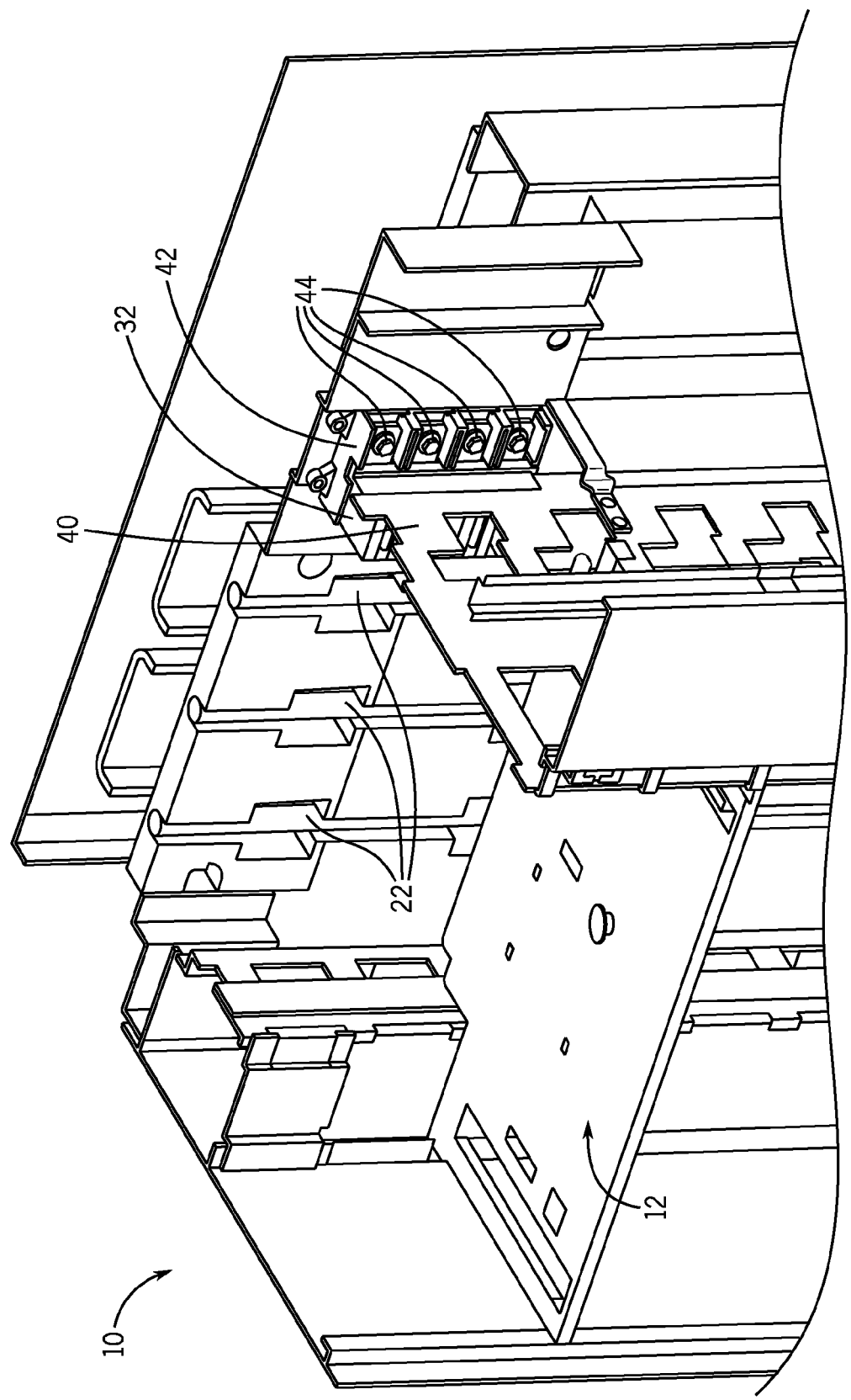
FIG. 2 is a perspective view of an embodiment of the electrical enclosure of FIG. 1, illustrating vertical bus bars and a motor bus disposed near the rear of the electrical enclosure.

FIG. 2 is a perspective view of an embodiment of the electrical enclosure 10 of FIG. 1, illustrating the vertical bus bars 22 and the motor bus 32 disposed near the rear of the enclosure 10. The motor bus 32 may be coupled to a load terminal 42 (e.g., load-side terminal) which may be connected to various types of loads or devices, such as, for example, various machines or motors. Particularly, the load terminals 42 may be configured to transfer power to the loads. The load terminals 42 may include any number of conductors, such as connection bolts 44, which may engage with the unit 20 and/or the ground element 38, as further described in detail with respect to FIGS. 3-4.

Figure 3:
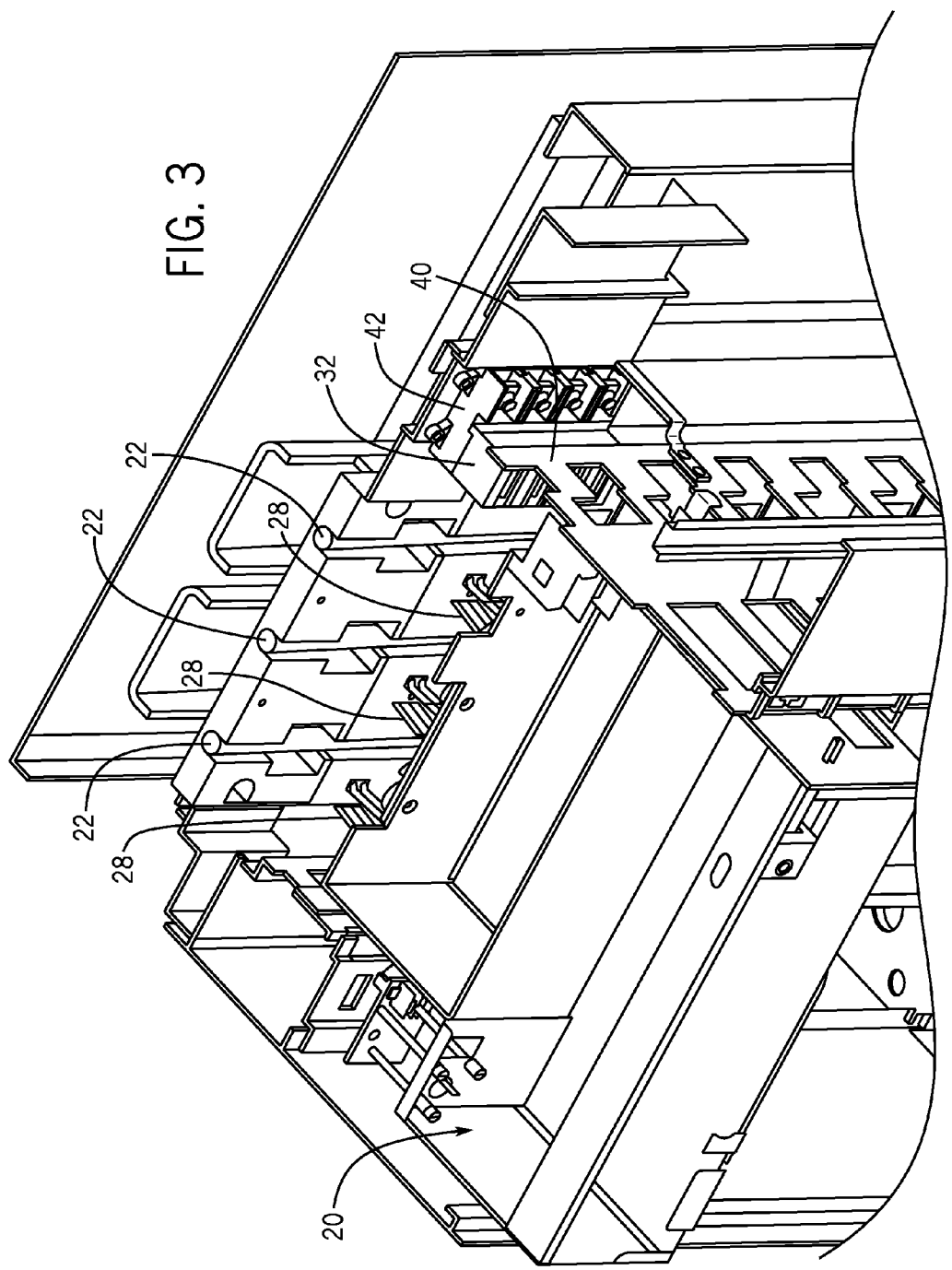
FIG. 3 is a perspective view of an embodiment of the electrical enclosure and the unit of FIG. 1, illustrating the unit inserted into a compartment of the electrical enclosure.

FIG. 3 is a perspective view of an embodiment of the enclosure 10 and the unit 20 of FIG. 1, illustrating the unit 10 being inserted into the compartment 12 of the electrical enclosure 10. Specifically, in certain embodiments, the component units 20 (e.g., plug-in units 20 or buckets 20), may be inserted or withdrawn from the compartments 12 of the enclosure 10. For example, as the unit 20 is inserted into the enclosure 10, the stab housings 28 of the unit 20 may engage the vertical bus bars 22 disposed within the rear of the enclosure 10. When the unit 20 is engaged with the bus bars 22, the bus bars 22 may be configured to deliver three phase ac power to unit 20 via the electrical connection formed. Likewise, when the unit 20 is disengaged with the bus bars 22 (e.g., the unit 20 is withdrawn from the enclosure 10) the electrical connection may be terminated such that the unit 20 no longer receives power. Similarly, when the unit 20 is inserted or withdrawn from the enclosure 10, various connections on the unit 20 may engage or disengage with the motor bus 32 disposed within the rear of the enclosure 10. The motor bus 32 may be utilized by the enclosure 10 to mange a power supply to a load (e.g., devices, motors, etc.) disposed outside of the enclosure 10.

As noted above, in certain situations, the units 20 are withdrawn or disconnected from the enclosure 10 while various equipment (e.g., motors, loads, etc.) disposed outside of the enclosure 10 may be still operating, thereby creating voltage known as back electro-motive force (EMF). Accordingly, in certain embodiments, the ground element 38 may be configured to ground the load terminals 42 when the unit 20 is withdrawn from the enclosure 10 to help protect an operator removing the unit 20, as further described below with respect to FIGS. 3-4.

Figure 4:
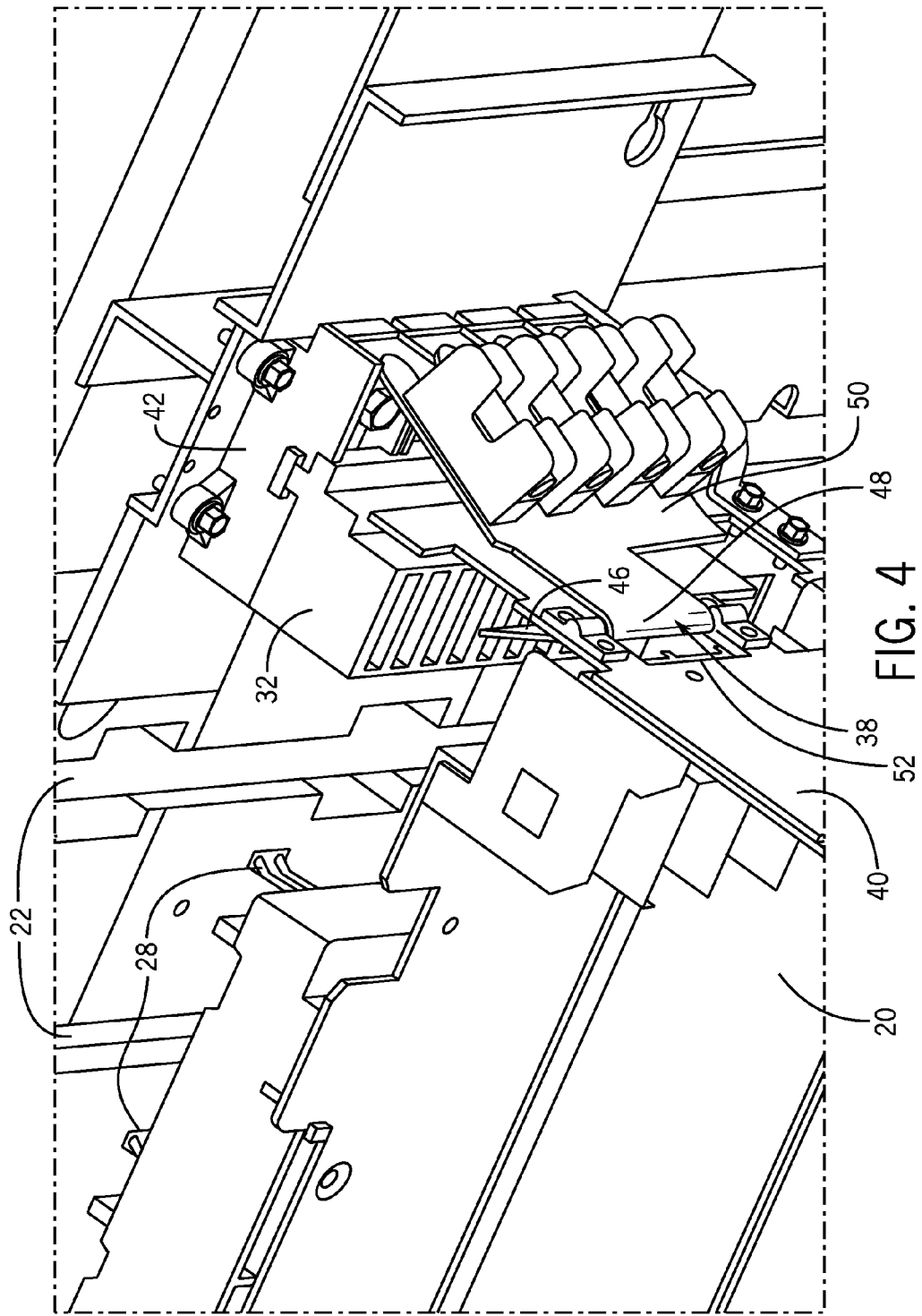
FIG. 4 is a perspective view of an embodiment of a ground element disposed within the electrical enclosure of FIG. 1, illustrating the ground element engaging with motor load terminals when the unit is not connected to the vertical bus bars and the motor bus of the enclosure.

FIG. 4 is a perspective view of an embodiment of the ground element 38 disposed along the support wall 40 within the enclosure 10 of FIG. 1. In particular, the ground element 38 (e.g., ground bracket) may be configured to engage with motor load terminals 42 when the unit 20 is withdrawn from the enclosure 10. Specifically, in certain embodiments, the ground element 38 may include an actuator side 46, a spring system 48, and a support side 50. The spring system 48 of the ground element 38 may include one or more springs, coils, dual coiled spring, latches, spring hinge, torsion spring, or any other form of structure that allows the ground element 38 to pivot along an opening 52 of the support wall 40. In some situations, the actuator side 46 of the ground element 38 may be biased to actuate in response to the insertion of the unit 20. For example, as the unit 20 is inserted into the enclosure 10, the unit 20 biases the actuator side 46 of the ground element 38 against the support wall 40. In other situations, the spring system 48 of the ground element 28 may be configured to provide a force (e.g., torsion force) in the opposite direction, such that the actuator side 48 is no longer biased against the support wall 40. For example, as the unit 20 is withdrawn from the enclosure 10, the spring system 48 rotates the actuator side 46 away from the support wall 40. Accordingly, the support side 50 of the ground element 38 may be configured to engage with the motor load terminals 42 when the unit 20 is withdrawn from the enclosure 10, and may be configured to disengage with the motor load terminals 42 when the unit 20 is inserted into the enclosure 10.

For example, in the illustrated embodiment, the stab housings 28 of the unit 20 are not engaged with the vertical bus bars 22 and the motor bus 32 of the enclosure 10. In such situations, the unit 20 may be in the process of being withdrawn from the enclosure 10 or may be in the process of being inserted into the enclosure 10. In either situation, the stab housings 28 of the unit 20 are disengaged from the vertical bus bars 22, thereby disconnecting the unit 20 from the power source. Likewise, the unit 20 is disengaged from the load bus 32. In such situations, the unit 20 may not be biasing the actuator side 46 of the ground element 38 such that the actuator side 46 is along the support wall 40. Accordingly, the spring system 48 of the ground element 28 may be configured to provide a force in the opposite direction, such that the support side 50 engages with the load terminals 42. In this manner, when the stab housings 28 of the unit 20 are not engaged with the vertical bus bars 22 and the motor bus 32, the support side 50 of the ground element 38 may be configured to engage and ground the load terminals 42.

Figure 5:
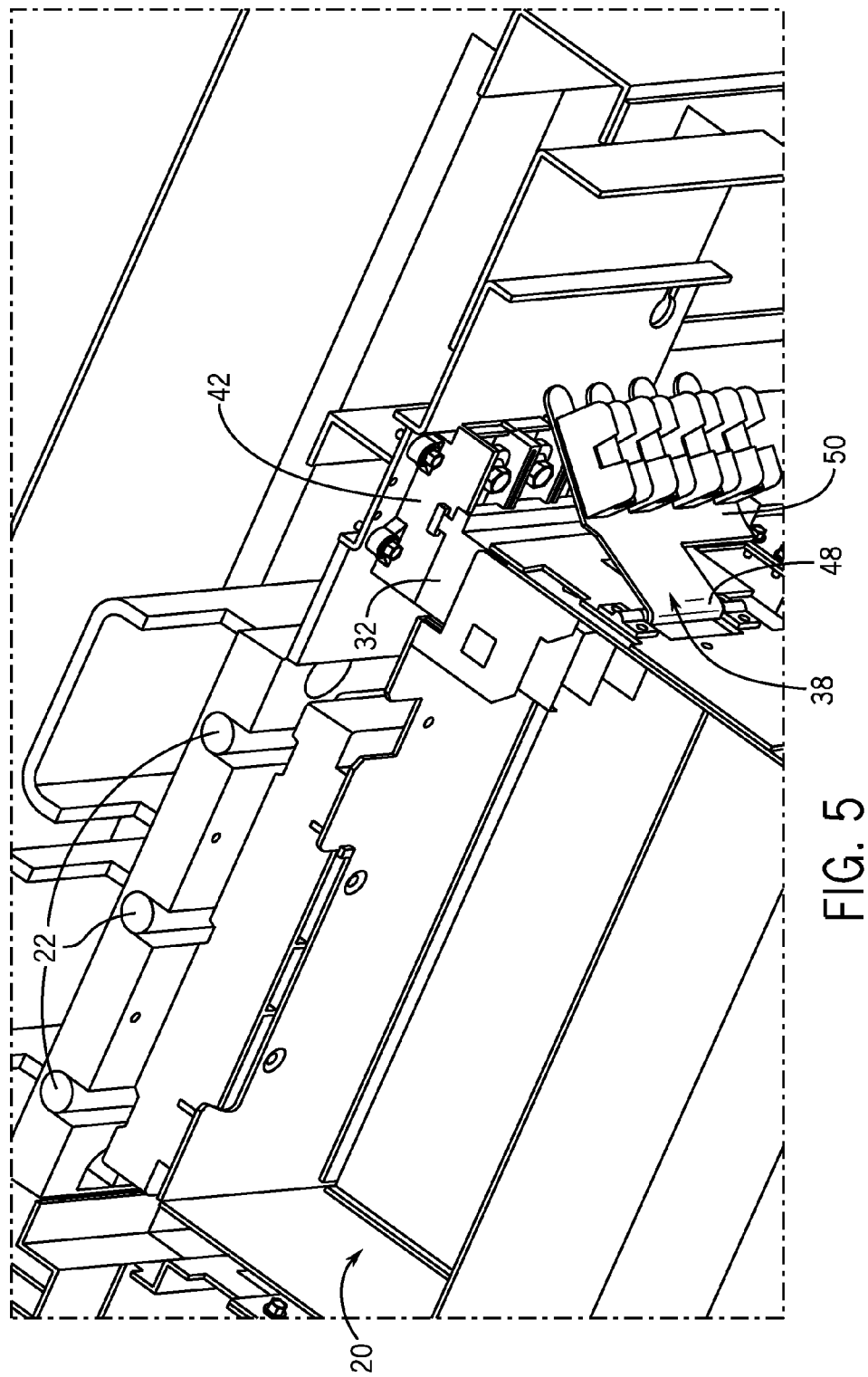
FIG. 5 is a perspective view of an embodiment of the ground element of FIG. 4 disposed within the electrical enclosure of FIG. 1, illustrating the ground element not engaging the motor load terminals when the unit is connected to the vertical bus bars and the motor bus of the enclosure.

FIG. 5 is a perspective view of an embodiment of the ground element 38 disposed along the support wall 40 within the enclosure 10 of FIG. 1. In particular, the ground element 38 (e.g., ground bracket) may be configured to disengage with motor load terminals 42 when the unit 20 is inserted into the enclosure 10. For example, in the illustrated embodiment, the stab housings 28 of the unit 20 are engaged with the vertical bus bars 22 and the motor bus 32 of the enclosure 10. In such situations, the unit 20 may be inserted into the enclosure 10, and the unit 20 may be receiving power via the bus bars 22. Likewise, the unit 20 is engaged with the load bus 32. In such situations, the unit 20 may be biasing the actuator side 46 of the ground element 38 such that the actuator side 46 is pushed against the support wall 40. Accordingly, the support side 50 pivots away from load terminals 42 and disengages with the load terminals 42. In this manner, when the stab housings 28 of the unit 20 are engaged with the vertical bus bars 22 and the motor bus 32, the support side 50 of the ground element 38 may be configured to disengage with the load terminals 42, thereby not grounding the load terminals 42 when the unit 20 is engaged within the enclosure 10.

It should be noted that in other embodiments, the ground element 38 may be constructed differently, but in a manner that allows components of the ground element 38 to automatically engage or disengage with the with motor load terminals 42 when the unit 20 is withdrawn from or inserted into the enclosure 10, respectively. For example, in certain embodiments, the ground element 38 and/or the components of the ground element 38 (e.g., the actuator side 46, the spring system 48, or the support side 50) may be a different shape or size. Further, the ground element 38 may be incorporated into the support wall 40, such that the components (e.g., the actuator side 46, the spring system 48, or the support side 50) of the ground element 38 are extensions of the support wall 40. In other embodiments, the ground element 38 may be an automated component of the electrical enclosure 10. For example, withdrawing and/or inserting the unit 20 into the enclosure 10 may trigger and/or activate a switch that automatically engages or disengages the ground element 38 with the motor load terminals 42, thereby grounding the load terminals 42 when the unit 20 is disengaged and not grounding the load terminals 42 when the unit 20 is engaged.

Figure 6:
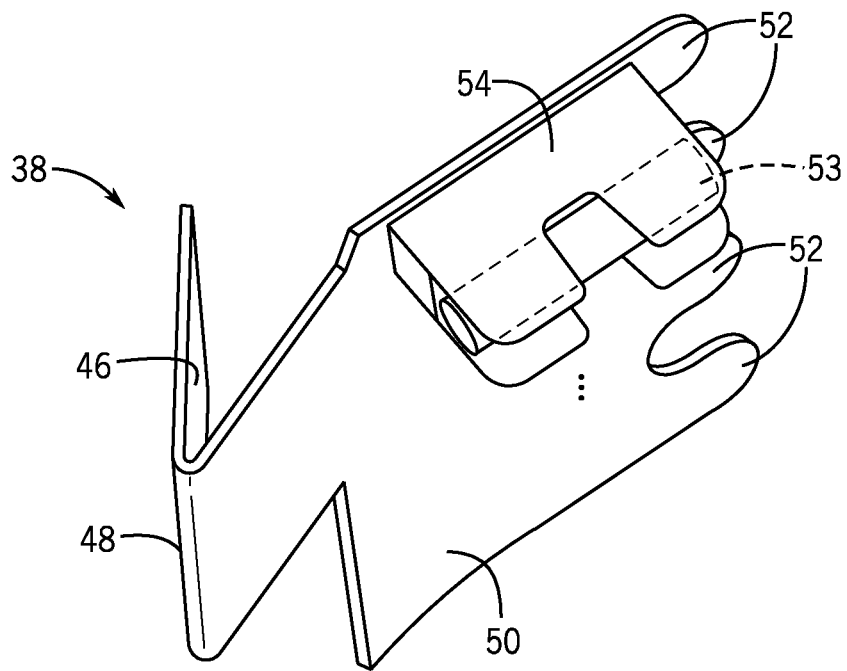
FIG. 6 is a perspective view of an embodiment of the ground element of FIG. 4 illustrating an actuator side and a support side, where the support side includes extensions configured to ground the motor load terminals.

FIG. 6 is a perspective view of an embodiment of the ground element 38 of FIG. 4 illustrating the actuator side 46 and the support side 50, where the support side 50 includes a series of extensions 52 configured to ground the motor load terminals 42 upon contact with the motor load terminals 42. In certain embodiments, the ground element 38 may be a continuous sheet of metal that may be bent to form the actuator side 46 and the support side 50. In other embodiments, the ground element 38 may be formed of one or more pieces welded or otherwise coupled together. The support side 50 may be configured to support one or more fuses 53 surrounded by a housing 54 (e.g., fuse housing). The housing 54 may be configured to electrically isolate and support each fuse 53 on the support side 50. In particular, each extension 52 may have a corresponding fuse 53 within the housing 54. In certain embodiments, the housing 54 may be a unitary housing structure configured to surround and support the fuses 53. The extensions 52 may be formed of steel, or any other type of materials suitable for grounding the load terminals 42. In particular, each extension 52 on the support side 50 may be configured to contact a conductor (e.g., bolt) on the load terminals 42, such that each extension 52 on the support side 50 has a corresponding contact location on the load terminals 42. Upon contact of the extensions to the load terminals 42, fused ground connections are formed between the load terminals 42 and the ground element 18, such that the load terminals 42 are grounded to the ground element 38 and the enclosure 10.

In particular, the extensions 52 of the ground element 38 may be configured to provide a fused connection with the load terminals 42. For example, upon contact of the extensions 52 to the load terminals 42, the load terminals 42 are fused such that the ground element 38 cannot create a short to the enclosure 10 when the loads are still operating. Accordingly, the ground element 28 may be additionally configured to protect the enclosure 10 against potential mechanical failures caused by a short. In this manner, the fused connections formed by the ground element 38 may be configured to help additional features to the enclosure 10.

Figure 7:
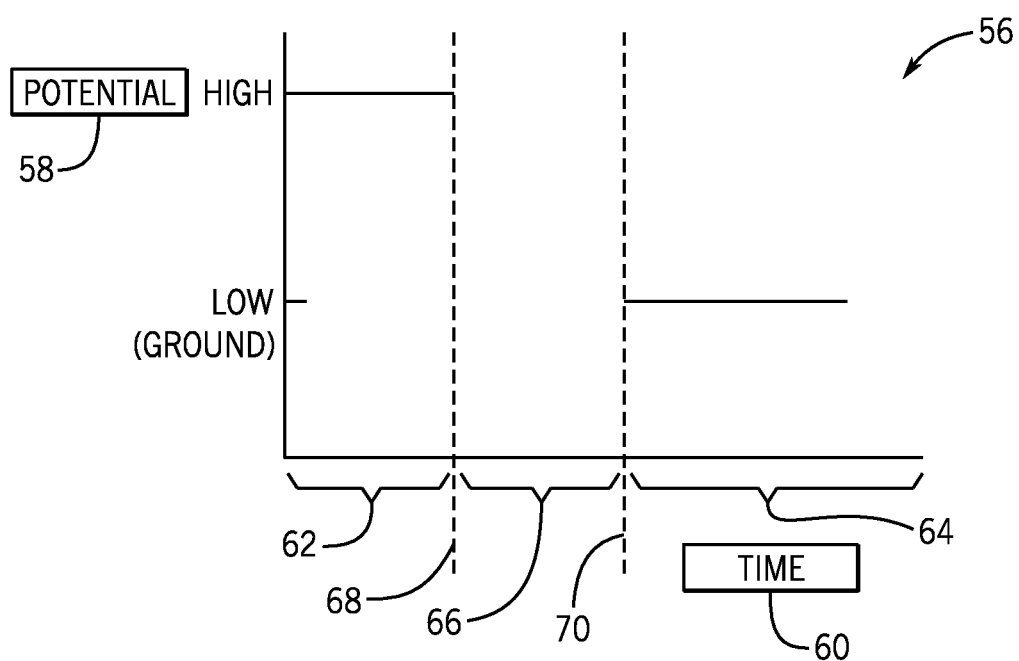
FIG. 7 is a graph depicting the potential of the ground element of FIG. 4 as the unit is connected and disconnected from the enclosure of FIG. 1.

FIG. 7 is a graph 56 depicting a potential 58 of the ground element 38 of FIG. 4 over a period of time 60, such as over a period of time when the unit 20 is connected and disconnected from the enclosure 10 of FIG. 1. In particular, the graph 56 may be representative of the change in potential as the unit 20 is inserted and/or withdrawn from the enclosure 10, thereby disengaging and/or engaging the ground element 38 respectively. For example, a first time period 62 may be indicative of the situation where the stab housings 28 of the unit 20 are engaged with the vertical bus bars 22 and the motor bus 32 of the enclosure 10. In such situations, the unit 20 may be receiving power via the bus bars 22 and the unit 20 is engaged with the load bus 32. Accordingly, the potential during the first time period 62 may be high. Likewise, in some situations, a second time period 64 may be indicative of the situation where the stab housings 28 of the unit 20 are not engaged with the vertical bus bars 22 and the motor bus 32 of the enclosure 10, such as if the unit 20 was in the process of being inserted or withdrawn from the enclosure 10. As noted above, in such situations, the ground element 28 may be engaged with the load terminals 42 to provide fused grounded connection. Accordingly, the potential during the second time period 64 may be low.

In some situations, there may be a period of time 66 when the unit 20 is not powered or grounded, such the period of time between when the stab housings are not engaged with the vertical bus bars 22 or the motor bus 32 (e.g., unit 20 withdrawn) and the ground element 38 has not yet formed fused connections with the load terminals 42. For example, a time point 68 may be indicative of the moment when the unit 20 is disengaged from the bus bars 22 of the enclosure and a time point 70 may be indicative of the moment when the ground element 38 is engaged with the load terminals 42.

As such, the ground element 38 may be utilized to ground the load terminals 42 within the enclosure 10 when the unit 20 is withdrawn from the enclosure 10. In particular, the ground element 38 includes a support side having a plurality of extensions 52 configured to contact the load terminals 42. Further, each extension 52 has a corresponding fuse 53 disposed in a unitary housing 54. The ground element 38 is configured to create fused ground connections with the load terminals 42 when the unit 20 is withdrawn from the enclosure 10, and may protect an operator removing the unit 20 from EMF generated by loads continuing to operate outside of the enclosure 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control center system, comprising:
an electrical enclosure having buses for routing electrical power,
a component unit disposed in a compartment of the electrical enclosure and in operation receiving the electrical power from the buses, wherein the component unit contains a component for managing a power supply to a load disposed outside of the enclosure; and
a ground element disposed along a support wall of the compartment, wherein the ground element that in operation provides a fused ground connection with a load terminal of the electrical enclosure when the component unit is withdrawn from the electrical enclosure, wherein the ground element comprises a fuse electrically disposed between the load terminal and the ground element when the component unit is withdrawn from the electrical enclosure.

2. The system of claim 1, wherein the component unit comprises one or more stab housings that in operation engage with the buses to provide a multi-phase power source for the component unit.

3. The system of claim 1, wherein the ground element comprises a support side with an extension piece that in operation contacts a conductor of the load terminal within the electrical enclosure.

4. The system of claim 3, wherein the ground element comprises a housing structure that in operation houses multiple fuses of the ground element for multi-phase electrical power, wherein each extension piece has a corresponding fuse within the housing structure.

5. The system of claim 3, wherein the ground element comprises an actuator side that in operation actuates the support side of the ground element so that the extension piece contacts the load terminal.

6. The system of claim 3, wherein the ground element comprises a spring system that in operation actuates the support side of the ground element so that the extension piece is actuated away from the load terminal.

7. The system of claim 1, wherein the ground element is disposed within an opening on the support wall of the compartment.

8. The system of claim 7, wherein the ground element that in operation pivots within the opening of the support wall.

9. The system of claim 1, wherein the ground element is formed of a continuous sheet of metal that is bent to form an actuator side and a support side.

10. A method, comprising:
inserting a component unit into a compartment of an electrical enclosure to engage stab housings on the component unit to buses that in operation route electrical power;
supplying power to the component unit via the buses, wherein the component unit contains a component that in operation manages a power supply to a load disposed outside of the enclosure;
withdrawing the component unit from the electrical enclosure to disengage the stab housings on the component unit from the buses; and
automatically grounding a load terminal of the electrical enclosure by forming a fused ground connection between a ground element and the load terminal, wherein the fused ground connection is provided by a fuse electrically disposed between the load terminal and the ground element when the component unit is withdrawn from the electrical enclosure.

11. The method of claim 10, wherein inserting the component unit into the compartment of the electrical enclosure comprises:
  biasing an actuator side of the ground element; and
  actuating a support side of the ground element away from the load terminal to remove the fused ground connection between the ground element and the load terminal.

12. The method of claim 10, wherein grounding the load terminal of the electrical enclosure comprises providing a force via a spring system of the ground element to actuate a support side of the ground element into making contact with the load terminal.

13. The method of claim 10, wherein the ground element comprises an extension piece that in operation contacts the load terminal to form the fused ground connection.

14. The method of claim 10, wherein the ground element comprises a unitary housing structure that in operation houses one or more fuses.

15. The method of claim 11, wherein inserting the component unit into the enclosure comprises biasing the actuator side of the ground element against a support wall of the enclosure.

16. An electrical power supply system, comprising:
  a plurality of electrical connectors which couple an multi-phase power supply to a power component;
  a plurality of load terminals that in operation couple the electrical power supply system to an external load; and
  a ground element comprising a plurality of extension pieces, wherein the ground element forms fused ground connections between each extension piece and load terminal to ground the load terminals, wherein the ground element comprises fuses electrically disposed between the load terminals and the ground element when a component unit is withdrawn from the electrical enclosure.

17. The system of claim 16, wherein:
  the electrical power supply system comprises a motor control center; and
  the plurality of electrical connectors are comprised in a stab housing coupled to the multi-phase power supply via power bus bars.

18. The system of claim 16, wherein the ground element comprises a unitary housing structure that in operation houses each fuse of the ground element, wherein each extension piece has a corresponding fuse within the housing structure.

19. The system of claim 18, wherein each fuse of the housing structure in operation prevents short circuiting within the enclosure.

20. The system of claim 17, further comprising multiple component units disposed within the motor control center, wherein the wherein the ground element provides the fused ground connection with the load terminals when the component are withdrawn from the motor control center.

* * * * *